(12) United States Patent
Steeby

(10) Patent No.: US 6,224,511 B1
(45) Date of Patent: May 1, 2001

(54) PARTIALLY AUTOMATED LEVER-SHIFTED MECHANICAL TRANSMISSION SYSTEM

(75) Inventor: Jon A. Steeby, Schoolcraft, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/294,118

(22) Filed: Apr. 19, 1999

Related U.S. Application Data

(63) Continuation of application No. 08/902,603, filed on Aug. 7, 1997.

(51) Int. Cl.$^7$ .................................................. B60K 41/08
(52) U.S. Cl. .............................. 477/111; 477/123; 74/335
(58) Field of Search ................................ 477/111, 107, 477/109, 123, 124; 74/335

(56) References Cited

U.S. PATENT DOCUMENTS

| | | |
|---|---|---|
| 4,361,060 | 11/1982 | Smyth . |
| 4,595,986 | 6/1986 | Daubenspeck et al. . |
| 4,754,665 | 7/1988 | Vandervoort . |
| 4,788,889 | 12/1988 | Davis et al. ........................... 74/745 |
| 4,850,236 * | 7/1989 | Braun ................................... 477/109 |
| 4,920,815 | 5/1990 | Reynolds . |
| 5,329,826 * | 7/1994 | Graves, Jr. et al. .................... 74/335 |
| 5,390,561 | 2/1995 | Stine . |
| 5,582,558 * | 12/1996 | Palmeri et al. ....................... 477/109 |
| 5,595,551 * | 1/1997 | Hedstrom et al. .................... 477/109 |
| 5,651,292 | 7/1997 | Genise . |
| 5,661,998 | 9/1997 | Genise . |
| 5,682,790 | 11/1997 | Genise . |
| 5,735,771 | 4/1998 | Genise . |
| 5,743,143 | 4/1998 | Carpenter et al. . |
| 5,755,639 | 5/1998 | Genise et al. . |
| 5,766,111 * | 6/1998 | Steeby et al. ........................ 477/124 |
| 5,904,068 | 5/1999 | Genise ................................... 74/335 |
| 5,904,635 * | 5/1999 | Genise et al. ........................ 477/111 |

* cited by examiner

Primary Examiner—Dirk Wright
(74) Attorney, Agent, or Firm—Howard D. Gordon

(57) ABSTRACT

A partially automated transmission system (100) and method for controlling same is provided. The system includes a manually shifted splitter-type transmission (10) having a splitter section (14) and a manually shifted main section (12). The splitter section is controlled by a three-position splitter actuator (116) under control from a system ECU (146). A sensor (120) is provided for sensing an operator's intent to shift and, upon sensing an intent to shift, the splitter section is urged to the neutral position while engine fueling is controlled to cause a reduced drive line torque condition.

14 Claims, 6 Drawing Sheets

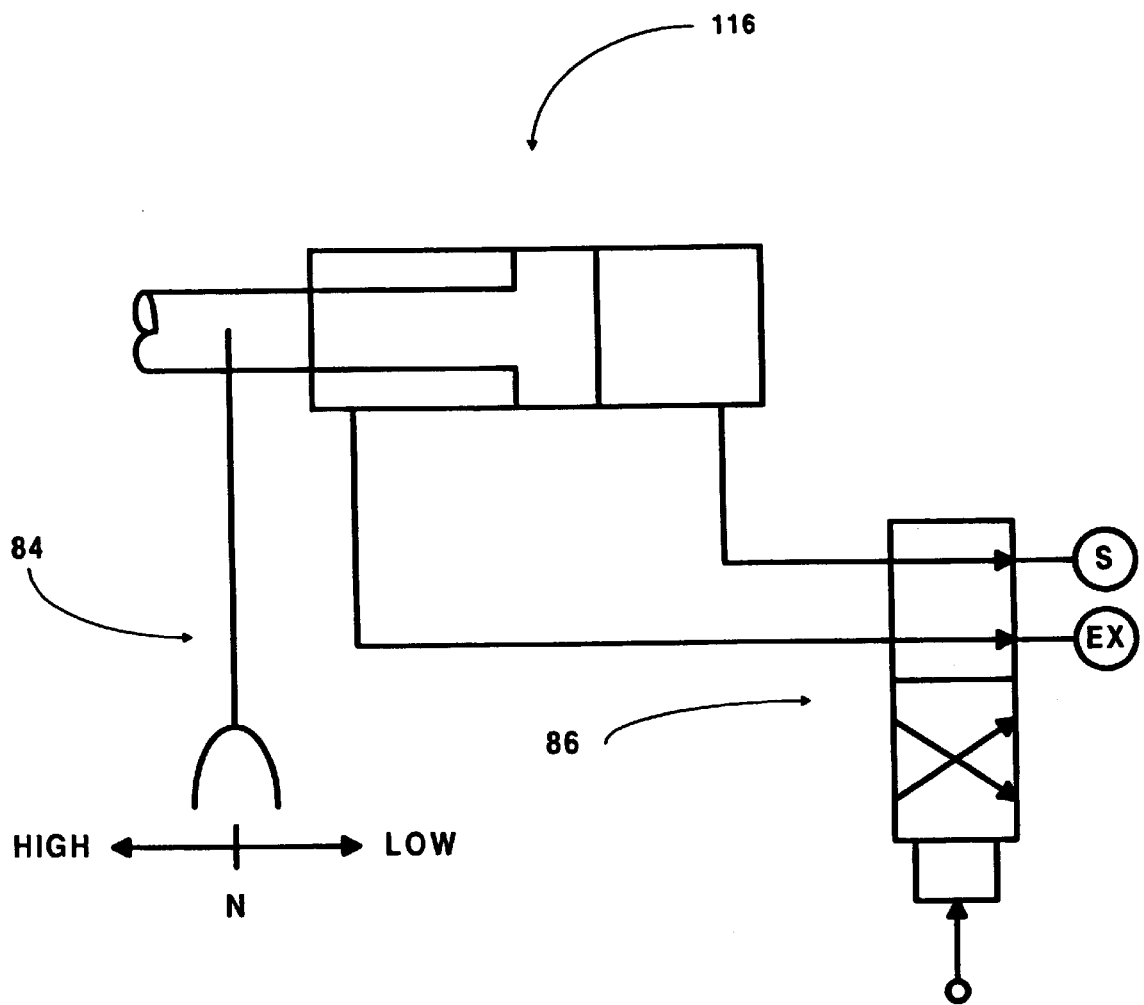

PARTIALLY AUTOMATED LEVER-SHIFTED MECHANICAL TRANSMISSION SYSTEM

RELATED APPLICATIONS

This application is a continuing application of copending U.S. Ser. No. 08/902,603, filed Aug. 7, 1997 and titled PARTIALLY AUTOMATED LEVER-SHIFTED MECHANICAL TRANSMISSION SYSTEM.

This application is related to the following co-pending U.S. patent applications, all assigned to EATON CORPORATION, the assignee of this application:

Ser. No. 08/990,078 filed Dec. 15, 1997 titled ASSISTED, LEVER-SHIFTED TRANSMISSION Ser. No. 09/053,181 filed Apr. 1, 1998 titled ADAPTIVE SPLITTER ACTUATOR ENGAGEMENT FORCE CONTROL Ser. No. 09/148,873 filed Sep. 8, 1998 titled CONTROL FOR CONTROLLER-ASSISTED, MANUALLY SHIFTED, SPLITTER-TYPE COMPOUND TRANSMISSION Ser. No. 09/178,346 filed Oct. 26, 1998 titled ROBUST CONTROL FOR THREE-POSITION TRANSMISSION SHIFT ACTUATOR ASSEMBLY

BACKGROUND OF THE INVENTION

1. Field of the Invention

The present invention is related to manually lever-shifted mechanical transmission systems having automated assist features including at least engine automation to achieve a substantially zero torque condition for shifting into neutral.

In particular, in a preferred embodiment, the present invention relates to a manually lever-shifted splitter-type compound mechanical transmission system including means to sense an operator intent to shift, an electronic control unit, an electronically controlled engine, and a three-position splitter actuator responsive to command output signals from the control unit. In the preferred embodiment, upon sensing an intent to shift, the electronic control unit is effective to cause automatic engine fueling to cause a substantially zero driveline torque, while urging the splitter actuator to splitter-neutral. Upon sensing a splitter-neutral condition, the automatic engine fueling to cause a substantially zero torque condition (preferably dithering intentially to cause a drive torque and then a coast torque condition, as described in U.S. Pat. No. 4,850,236) is ceased and the splitter retained in the splitter-neutral condition until a lever shift into main-section-neutral is sensed.

2. Description of the Prior Art

Fully automatic and semi-automatic vehicular mechanical transmission systems and fully or partially automated shift implementation systems utilizing electronic control units, usually microprocessor-based controllers, are known in the prior art. Examples of such automated mechanical transmission systems may be seen by reference to U.S. Pat. Nos. 3,961,546; 4,361,060; 4,425,620; 4,595,986; 4,631,679; 4,648,290; 4,722,248; 4,850,236; 5,038,627; 5,050,079; 5,053,959; 5,053,961; 5,053,962; 5,063,511; 5,081,588; 5,089,962; 5,089,965; 5,133,229; 5,172,609; 5,231,582; 5,272,939; 5,335,566; 5,435,212; 5,508,916 and 5,509,867, the disclosures of which are incorporated herein by reference.

Partially automated mechanical transmission systems having automatic splitter shifting and/or automatic shifting between the highest sequentially related group of ratios, and requiring manual shifting in the lower ratios, are known in the prior art, as may be seen by reference to aforementioned U.S. Pat. Nos. 4,722,248 and 4,850,236, and to U.S. Pat. Nos. 5,038,627; 5,393,277; 5,435,212 and 5,498,195, the disclosures of which are incorporated herein by reference.

Compound mechanical transmissions of the range, splitter or combined range-and-splitter type are well known in the prior art, as may be seen by reference to U.S. Pat. Nos. 3,799,002; 4,754,665; 4,920,815; 4,974,468; 5,000,060; 5,370,013 and 5,390,561, the disclosures of which are incorporated herein by reference.

Partially automated mechanical transmission systems providing automatic assistance, such as automatic engine fuel control, for manual lever-shifted transmissions are known in the prior art, as may be seen by reference to U.S. Pat. Nos. 5,682,790; 5,755,639; 5,735,791; 5,743,143; 5,569,115; 5,571,059; 5,573,477 and 5,582,558, the disclosures of which are incorporated herein by reference. These systems utilize automatic engine fueling controls and/or range and/or splitter shift actuators, actuated by a driver indication of an intent to shift, allowing an old gear to be disengaged and a new or target gear to be engaged without requiring the driver to manipulate the clutch pedal (required only for vehicle launch and stop) or the throttle pedal.

SUMMARY OF THE INVENTION

In accordance with the present invention, Applicants have provided a partially automated, manually lever-shifted vehicular mechanical transmission system which, at minimal additional cost compared to prior art comparably sized, fully manual and/or partially automated systems, provides at least automatic engine fueling and splitter actuator operation to allow a shift to neutral and also possibly added features, such as (i) automated shifting in the upper two sequentially related ratios, (ii) automatic implementation of manually requested splitter-only shifts and/or (iii) automated fuel control and splitter shifting for combined splitter and lever shifts.

The foregoing is accomplished by providing a vehicular transmission system including a manually lever-shifted, splitter-type transmission, an electronically controlled engine, means to sense a driver intent to shift, a three-position splitter actuator operable by command signals from an ECU and control logic residing in the engine ECU and/or a separate system ECU for processing input signals and issuing command output signals to said engine and said splitter actuator.

The logic, upon sensing an intent to shift, will urge the splitter to a neutral or disengaged position while controlling engine fueling to reduce drive line torque. Upon sensing that either the main or splitter section is in neutral, such automatic engine fueling will cease. Upon sensing main section neutral, the splitter section will be shifted into the appropriate splitter ratio for a known target gear ratio.

Accordingly, it is an object of the present invention to provide a new and improved partially automated, manually lever-shifted, splitter-type vehicular mechanical transmission system.

This and other objects and advantages of the present invention will become apparent from a reading of the following description of the preferred embodiment taken in connection with the attached drawings.

BRIEF DESCRIPTION OF THE DRAWINGS

FIGS. 1A–1C are a plan view of a combined range-and-splitter-type compound transmission.

DESCRIPTION OF THE PREFERRED EMBODIMENT

Figure 1A:
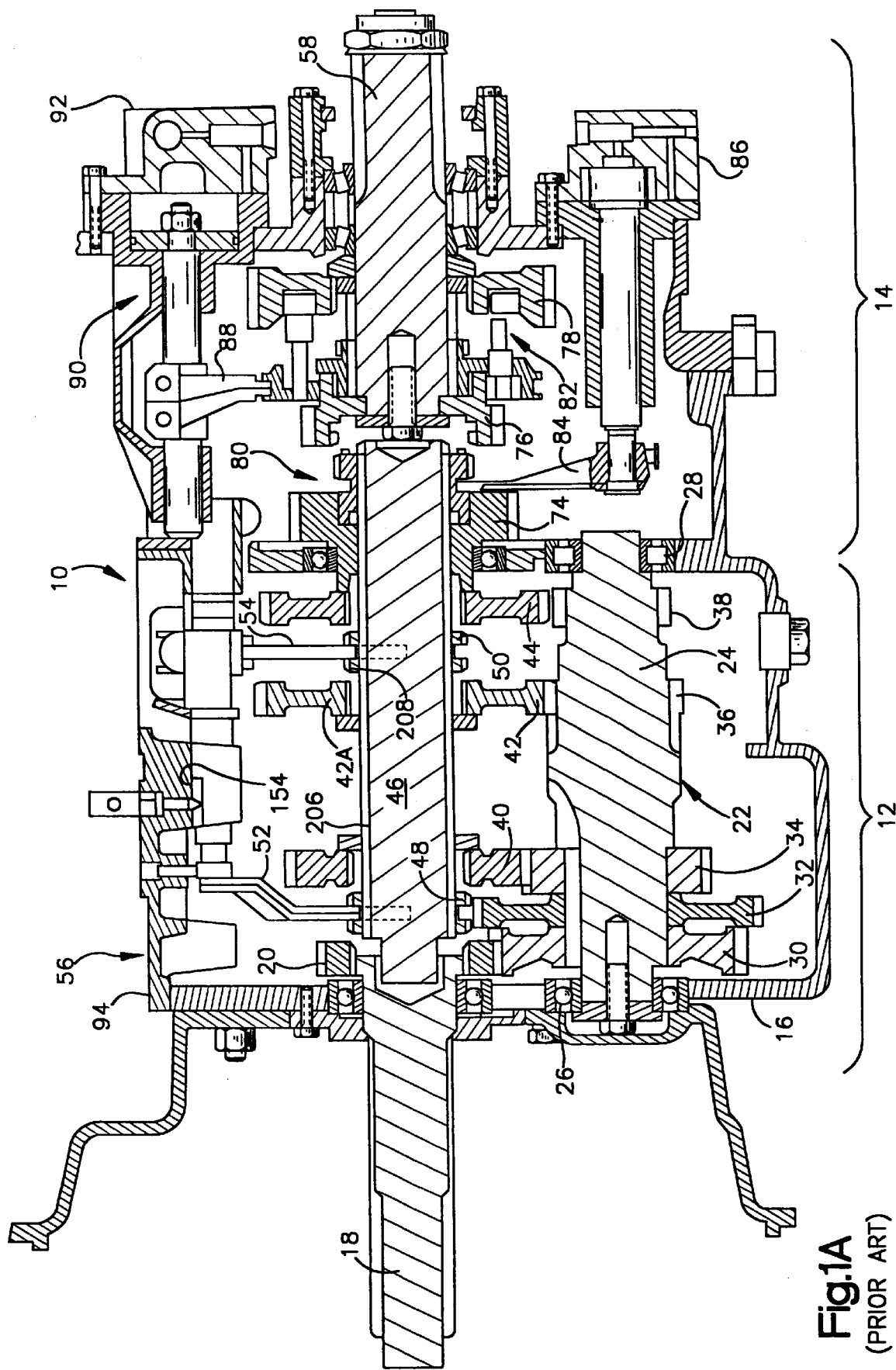
Figure 1B:
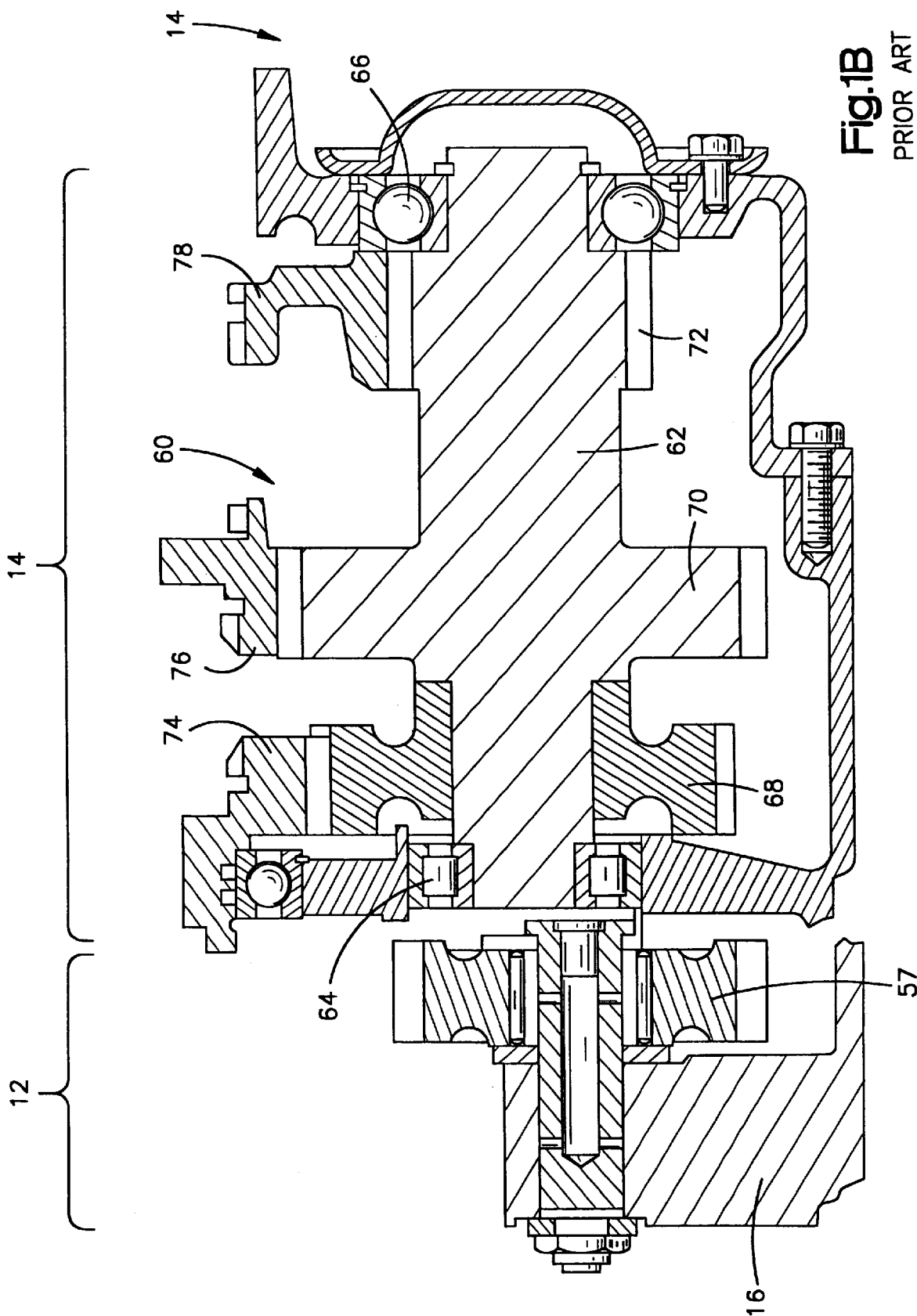

FIGS. 1A, 1B and 1C illustrate a combined range-and-splitter-type compound transmission 10 which is especially well suited for use in the partially automated, manually lever-shifted vehicular transmission system of the present invention. Transmission 10 comprises a main transmission section 12 connected in series with an auxiliary transmission section 14 having both range- and splitter-type gearing. Typically, transmission 10 is housed within a single multi-piece housing 16 and includes an input shaft 18 driven by a prime mover, such as a diesel engine, through a selectively disengaged, normally engaged, master friction clutch.

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are incorporated herein by reference, input gear 20 simultaneously drives a plurality of substantially identical main section countershaft assemblies at substantially identical rotational speeds. Each of the main section countershaft assemblies comprises a main section countershaft 24 supported by bearings 26 and 28 in housing 16 and is provided with main section countershaft gears 30, 32, 34, 36 and 38 fixed thereto. A plurality of main section drive or mainshaft gears 40, 42 and 44 surround the transmission mainshaft 46 and are selectively clutchable, one at a time, to the mainshaft 46 for rotation therewith by sliding clutch collars 48 and 50, as is well known in the art. Clutch collar 48 also may be utilized to clutch input gear 20 to the mainshaft 46 to provide a direct drive relationship between the input shaft 18 and the mainshaft 46. Typically, clutch collars 48 and 50 are axially positioned by means of shift forks or yokes 52 and 54, respectively, associated with a shift bar housing assembly 56, which may be of the multiple-shift-rail or single-shift-shaft type, as is known in the prior art, and which is manually controlled by a shift lever 57. Clutch collars 48 and 50 are, in the preferred embodiment, of the well-known, non-synchronized, double-acting jaw clutch type.

Transmissions of the type illustrated in FIGS. 1A–1C utilizing positive clutches to engage and disengage gear ratios are known as "mechanical" transmissions.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are three-position clutches in that they may be positioned in a centered axially non-displaced, non-engaged position, as illustrated, or in a fully rightwardly engaged or fully leftwardly engaged position.

Auxiliary transmission section 14 is connected in series with main transmission section 12 and is of the three-layer, four-speed combined splitter/range type, as illustrated in U.S. Pat. Nos. 4,754,665 and 5,390,561, the disclosures of which are incorporated herein by reference. Mainshaft 46 extends into the auxiliary section 14 and is journalled in the inward end of the output shaft 58, which extends from the rearward end of the transmission.

Auxiliary transmission section 14 includes a plurality of substantially identical auxiliary countershaft assemblies 60 (see FIG. 1A), each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78, which surrounds the output shaft 58.

A sliding double-sided jaw clutch collar 80 is utilized to selectively couple either the splitter gear 74 or the splitter/range gear 76 to the mainshaft 46, while a two-position synchronized clutch assembly 82 is utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12, and the function of double-acting synchronized clutch assembly 82 is substantially identical to the structure and function of prior art double-acting synchronized clutch assembly, examples of which may be seen by reference to U.S. Pat. Nos. 4,125,179 and 4,462,489, the disclosures of which are incorporated herein by reference.

The splitter jaw clutch 80 is a two-sided or double-acting clutch assembly which may be selectively positioned in the rightwardmost or leftwardmost positions for engaging either gear 76 or gear 74, respectively, to the mainshaft 46 or in an intermediate neutral or disengaged position by a shift fork 84 controlled by a three-position piston actuator. Two-position synchronized clutch assembly 82 also is a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90.

As may be seen by reference to FIGS. 1A–1C and 2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three-layer auxiliary section of the combined range-and-splitter type providing four selectable speeds or drive ratios between the input (mainshaft 46) and output (output shaft 58) thereof. The main section 12 provides a reverse and three potentially selectable forward speeds. However, one of the selectable main section forward gear ratios, the low speed gear ratios associated with mainshaft gear 42, is not utilized in the high range. Thus, transmission 10 is properly designated as a "(2+1)×(2)×(2)" type transmission providing nine or ten selectable forward speeds, depending upon the desirability and practicality of splitting the low gear ratio. While clutch 82, the range clutch, should be a synchronized clutch, double-acting clutch collar 80, the splitter clutch, is not required to be synchronized.

Figure 2:
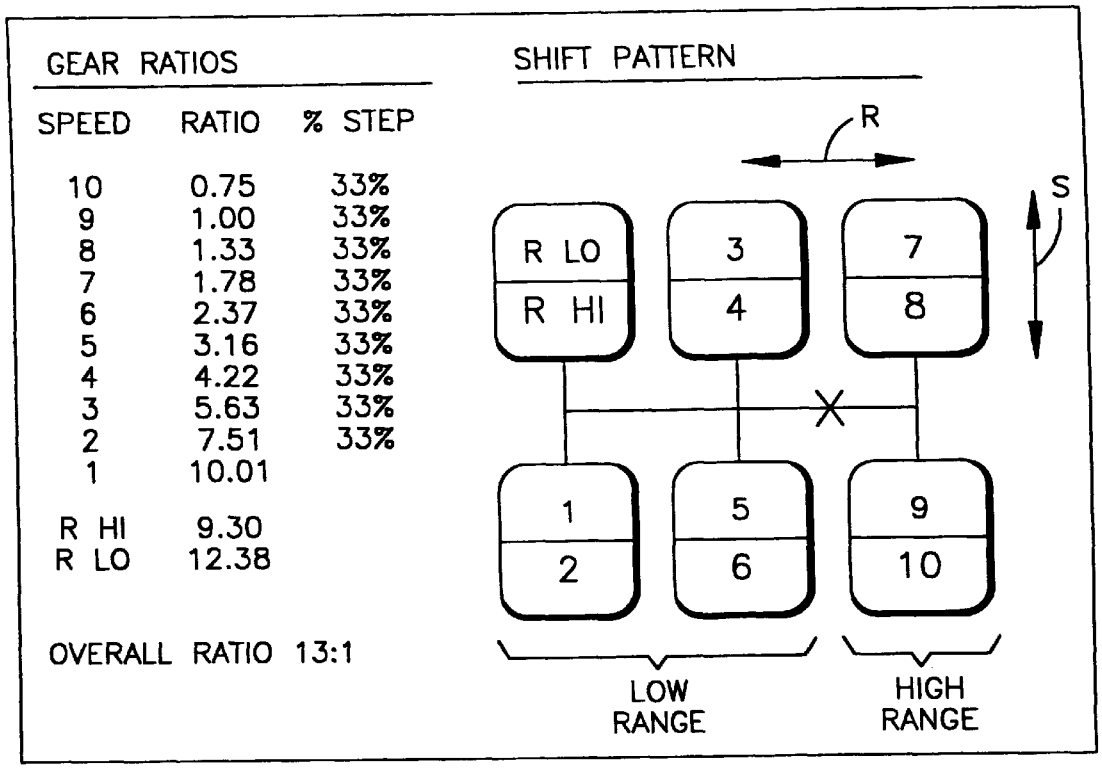
FIG. 2 illustrates a prior art shift pattern for the transmission of FIG. 1.

As disclosed in aforementioned U.S. Pat. No. 4,944,197, the main section ratios are selected and engagement thereof implemented manually by a shift lever and splitter shifts are implemented by a remote actuator. The range shift is manually or automatically selected and implemented by a remote two-position actuator. A separate range control button/lever may be provided, range shifts may be commanded by the system controller, or as illustrated in FIG. 2, a lever-operated "double-H" type control may be utilized. Range and splitter actuators and controls of this type are well known in the prior art, as may be seen by reference to U.S. Pat. No. 4,788,889, the disclosure of which is incorporated herein by reference.

The prior art shift pattern for shifting transmission 10 is schematically illustrated in FIG. 2. Divisions in the vertical direction at each gear lever position signify splitter shifts, while movement in the horizontal direction from the "¾ and ⅝" leg of the "H" pattern to the "⅞ and ⁹⁄₁₀" leg of the "H" pattern signifies a shift from the low range to the high range of the transmission.

To accomplish a shifting of the range section of the transmission 10 without requiring the operator to actuate any control device other than the gear lever movements to the rightwardmost leg of the shift pattern as seen in FIG. 2, a range control valve assembly is provided to provide a signal to a slave valve 92, located at piston assembly 90, to shift the shift fork 88. Alternatively, the ECU may command appropriate range shifts.

Figure 3:
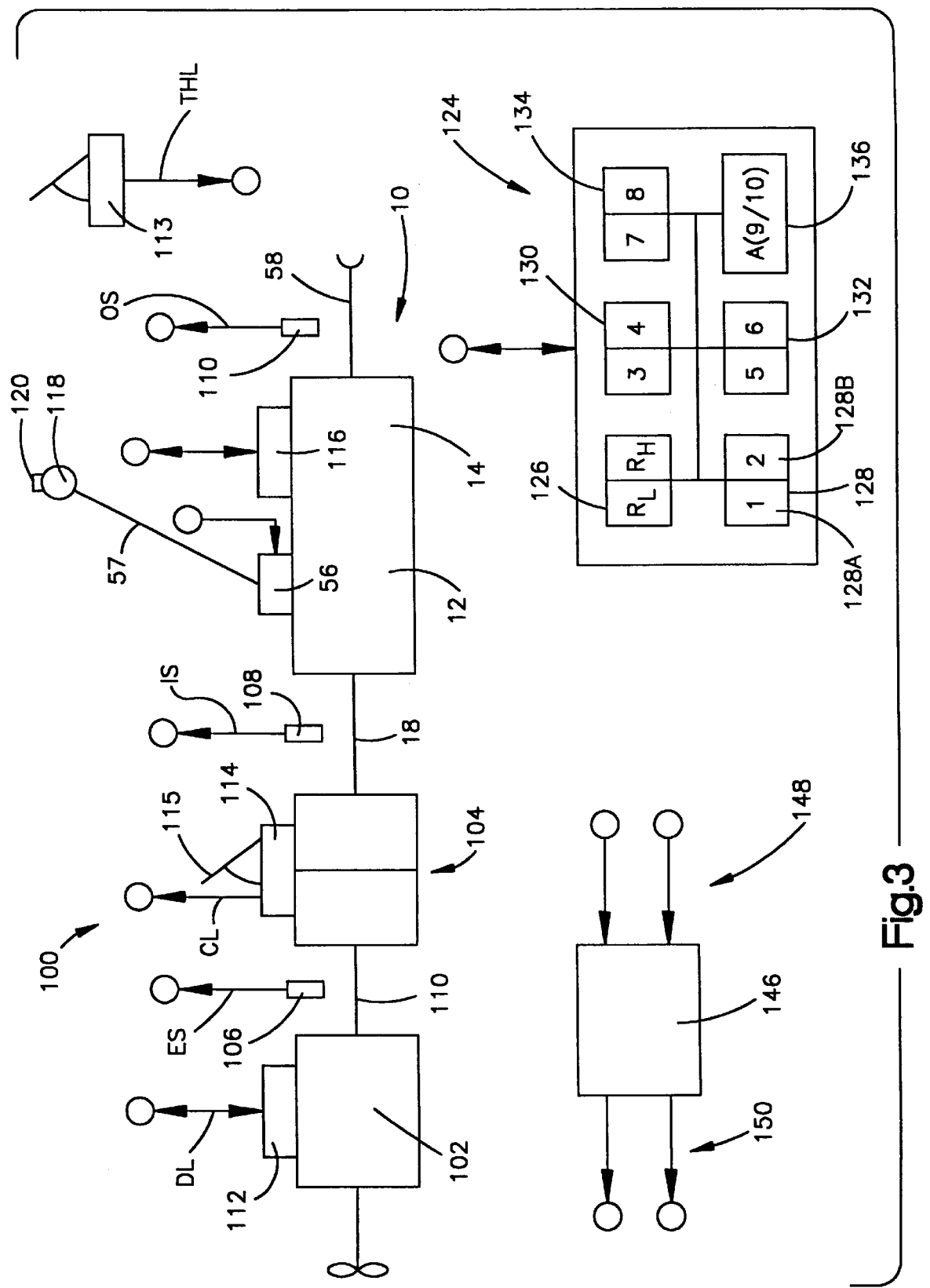
FIG. 3 is a schematic illustration, in block diagram format, of a semi-automated shift implementation transmission system advantageously utilizing the control of the present invention.

In a preferred embodiment of the present invention, the forward shifting of transmission 10, comprising a main section 12 coupled to an auxiliary section 14, is semi-automatically implemented/assisted by the vehicular semi-automatic transmission system 100, illustrated in FIG. 3. Main section 12 includes input shaft 18, which is operatively coupled to the drive or crank shaft 101 of the vehicle engine 102 by master clutch 104, and output shaft 58 of auxiliary section 14 is operatively coupled, commonly by means of a drive shaft, to the drive wheels of the vehicle (not shown).

The change-gear ratios available from main transmission section 12 are manually selectable by manually positioning the shift lever 57 according to the shift pattern prescribed to engage the particular change gear ratio of main section 12 desired. As will be described, manipulation of the master clutch 104 (other than when bringing the vehicle to or when launching the vehicle from an at-rest condition) and manual synchronizing is not required. The system includes means to signal an intent to shift into a target ratio and will automatically take actions to minimize or relieve torque-lock conditions, allowing, if required, an easier shift into main section neutral from the engaged main section ratio and further allowing required splitter shifts to be automatically and rapidly completed upon a shift into neutral. Upon sensing a neutral condition, the system will cause the engine to rotate at a substantially synchronous speed for engaging a target gear ratio.

The system 100 includes sensors 106 for sensing engine rotational speed (ES), 108 for sensing input shaft rotational speed (IS), and 110 for sensing output shaft rotational speed (OS) and providing signals indicative thereof. As is known, with the clutch 104 engaged and the transmission engaged in a known gear ratio, ES=IS=OS*GR (see U.S. Pat. No. 4,361,060).

Engine 102 is electronically controlled, including an electronic controller 112 communicating over an electronic data link (DL) operating under an industry standard protocol such as SAE J-1922, SAE J-1939, ISO 11898 or the like.

Throttle position (operator demand) is a desirable parameter for selecting shifting points and in other control logic. A separate throttle position sensor 113 may be provided or throttle position (THL) may be sensed from the data link. Gross engine torque ($T_{EG}$) and base engine friction torque ($T_{BEF}$) also are available on the data link.

Figure 4A:
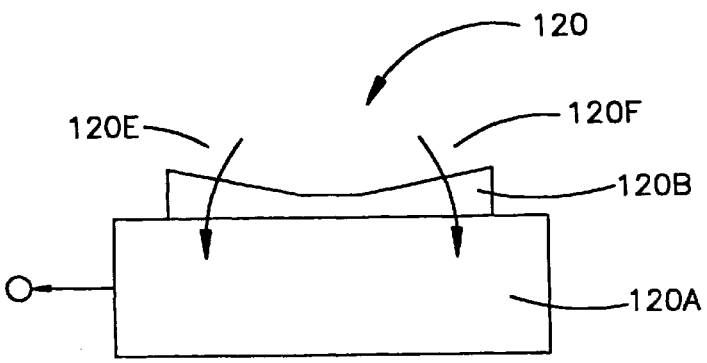
FIGS. 4A–4B are enlarged side and top views, respectively, of the operator selector switch.
Figure 4B:
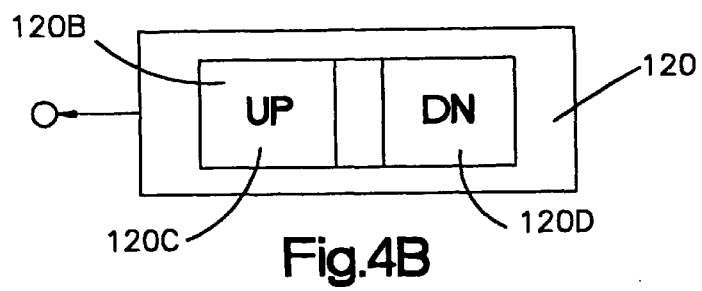

A manual clutch pedal 115 controls the master clutch, and a sensor 114 provides a signal (CL) indicative of clutch-engaged or -disengaged condition. The condition of the clutch also may be determined by comparing engine speed to input shaft speed. A splitter actuator 116 is provided for operating the splitter clutch 82 in accordance with command output signals. The shift lever 57 has a knob 118 which contains selector switch 120 by which a driver's intent to shift may be sensed. A preferred embodiment of selector switch 120 may be seen by reference to FIGS. 4A–4B. Switch 120 includes a body 120A in which is pivotably mounted a rocker member 120B. The rocker is spring-biased to the centered, non-displaced position illustrated. The operator may press surface 120C or 120D of the rocker member to cause the rocker switch to be pivoted in the direction of arrows 120E or 120F, respectively, to select an up- or downshift, respectively. The rocker may be moved in the direction of the arrows and then released to provide an "up" or "down" pulse or may be moved to and retained at the "up" or "down" positions to achieve different control results, as will be described in detail below. The rocker may be used to provide multiple pulses to request a skip shift (see U.S. Pat. No. 4,648,290). Alternatively, rocker 120B may be replaced by a toggle, pressure-sensitive surfaces, separate "up" and "down" buttons, or the like.

A driver's control display unit 124 includes a graphic representation of the six-position shift pattern with individually lightable display elements 126, 128, 130, 132, 134 and 136 representing each of the selectable engagement positions. Preferably, each half of the shift pattern display elements (i.e., 128A and 128B) will be individually lightable, allowing the display to inform the driver of the lever and splitter position for the engaged and/or target ratio. In a preferred embodiment, the engaged ratio is steadily lit, while the target ratio is indicated by a flashing light.

The system includes a control unit 146, preferably a microprocessor-based control unit of the type illustrated in aforementioned U.S. Pat. Nos. 4,595,986; 4,361,065 and 5,335,566, for receiving input signals 148 and processing same according to predetermined logic rules to issue command output signals 150 to system actuators, such as the splitter section actuator 116, the engine controller 112 and the display unit 124. A separate system controller 146 may be utilized, or the engine ECU 112 communicating over an electronic data link may be utilized.

As shown in U.S. Pat. Nos. 5,651,292 and 5,661,998, the disclosures of which are incorporated herein by reference, the splitter actuator 116 is, preferably, a three-position device, allowing a selectable and maintainable splitter section neutral.

Figure 5:
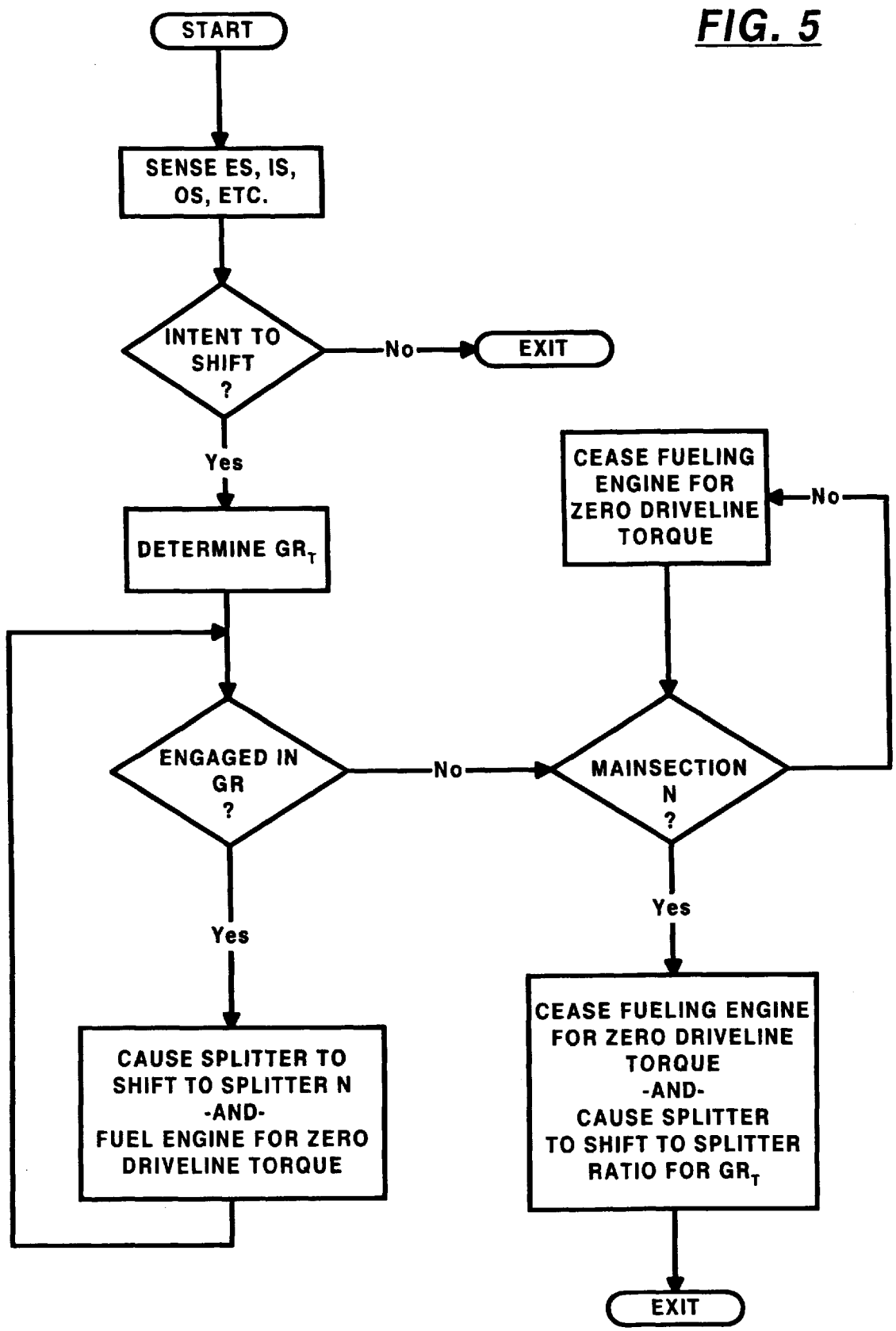
FIG. 5 is a schematic illustration, in flow chart format, of control logic for the system of FIG. 3.

FIG. 5 illustrates, in flow chart format, the operation of the preferred embodiment of the present invention.

Forward dynamic splitter-only shifts, other than for the more fully automatic 9-10 and 10-9 splitter shifts, such as third-to-fourth and fourth-to-third shifts, are automatically implemented upon driver request by use of the selector switch 120. By way of example, assuming a three-position splitter actuator, upon sensing that a splitter shift is required, by receiving a single "up" signal when engaged in first, third, fifth of seventh, or receiving a single "down" signal when engaged in second, fourth, sixth or eighth, the ECU 146 will issue commands to the actuator 116 to bias the actuator toward neutral, and to engine controller 112 to minimize or break torque. This may be accomplished by causing the engine to dither about a zero flywheel torque value (see aforementioned U.S. Pat. No. 4,850,236). As soon as splitter neutral is sensed, the engine will be commanded to a substantially synchronous engine speed for the target gear ratio at current output shaft speed ($ES=IS=OS*GR_T \pm E_{RROR}$). The engagement is timed, in view of reaction times and shaft speeds and accelerations, to occur just off synchronous to prevent clutch butting. Automatic splitter shifting of this general type is illustrated in aforementioned U.S. Pat. Nos. 4,722,248 and 5,435,212.

The more fully automated 9-10 and 10-9 splitter shifts are implemented in the same manner but are initiated by the ECU, not the selector switch 120, in accordance with predetermined shift schedules.

The engaged and neutral (not engaged) conditions of transmission 10 may be sensed by comparing the input shaft/output shaft rotational speeds to known gear ratios ($IS/OS=GR_{i=1 \, to \, 10} \pm Y$?) for a period of time. Position sensors may be utilized in lieu of or in addition to input shaft and output shaft speed logic.

When synchronizing to engage a target ratio, the engine is directed to achieve and remain at a speed about 30 to 100 RPM (preferably about 60 RPM) above or below (preferably below) true synchronous speed ($ES_{SYNCHRO}=(OS\times) \, GR_T$)–45 RPM) to achieve a good quality jaw clutch engagement without butting. To verify engagement of a target ratio, the system looks for input shaft speed equaling the product of output shaft speed and the numerical value of the target ratio, plus or minus about 10 to 30 RPM ($IS=(OS*GR_T)\pm20$ RPM) for a period of time, about 100 to 400 milliseconds.

The foregoing logic allows transmission engaged and neutral conditions to be determined on the basis of input and output shaft speeds without false engagement sensing caused by engine synchronizing for engagement of a target ratio (see co-pending U.S. Ser. No. 08/790,210).

When in an even numbered ratio (i.e., when in the high splitter ratio) and a single upshift is required, a lever upshift (with splitter downshift) is appropriate and the system, if requested by the driver, will automatically assist in implementing same. Similarly, when in an odd numbered ratio (i.e., when in the low splitter ratio) and a single downshift is requested, a lever downshift (with splitter upshift) is appropriate and the system, if requested by the driver, will automatically assist in implementing same. It is noted that in system 100, splitter-only shifts may be automatically implemented, while lever shifts, with accompanying splitter shifts, require driver initiation and main section jaw clutch manipulation.

When a combined lever-and-splitter shift is requested, a single pulse of the selector in the appropriate direction (as opposed to maintaining the rocker 120B in the appropriate displaced position) is taken as simply a request for an appropriate splitter shift with no automatic assistance, and the splitter will be preselected to shift to the appropriate splitter position and will do so when the operator manually shifts to neutral or otherwise breaks torque. The driver is then required to engage the appropriate main section ratio without intervention by the controller 148. This is substantially identical to the operation of a fully manual splitter-type transmission.

If the driver wishes automatic assistance for a combined lever-and-splitter shift, the rocker member 120B of the selector is moved to and retained (for at least 50 milliseconds to 1 second) in the appropriate position to request an assisted up- or downshift. The controller 148, upon receiving such a request, will automatically cause (for a period of about 2–5 seconds) the engine to be fueled to dither about a zero flywheel torque and the splitter to shift to splitter-neutral, thereby reducing or eliminating torque lock conditions and allowing the operator to easily manually shift to main section neutral (see U.S. Pat. Nos. 4,850,236 and 5,573,477). The display 124 will steadily light the old gear ratio and flash or otherwise indicate the selected ratio. The ECU 148 will sense for neutral conditions by comparing the ratio of input shaft speed (IS) to output shaft speed (OS) to known gear ratios. Alternatively or in combination, position sensors may be utilized. The logic will determine the identity of the target gear ratio $GR_T$ as a direct or indirect function of current gear ratio $GR_C$ and the direction of the requested shift.

When main section or splitter-neutral is sensed, the automatic dithering about zero will cease. Thus, even if the operator is tardy in shifting to main section neutral, dithering will cease upon sensing splitter section neutral.

When main section neutral is sensed, the display element corresponding to the disengaged gear ratio will not be lighted, the splitter will automatically be caused to shift to the appropriate splitter ratio and the engine will automatically be caused (for a period of about 2–5 seconds) to rotate at a substantially synchronous speed ($ES=OS*GR_T$) for engaging the target gear ratio ($GR_T$), allowing the operator to easily manually utilize the shift lever 57 to engage the indicated main section ratio. Preferably, the engine will automatically be caused to rotate at an offset from or to dither about true synchronous speed (see U.S. Pat. Nos. 5,508,916 and 5,582,558). Upon sensing engagement of the target ratio, the display indicator element corresponding to the newly engaged ratio will be steadily lit and engine fuel control will be returned to the operator. The assisted combined lever and splitter shift is accomplished without requiring the operator to manipulate the clutch pedal 115 or the throttle pedal 113.

As indicated above, a desire for a skip shift may be indicated by providing multiple pulses or a pulse followed by retaining the selector in the displaced position. By way of example, assuming operation in sixth gear, a "down" pulse followed rapidly by retaining the rocker 120B in the "down" displaced position will be taken as a request for assistance for a sixth-to-fourth skip downshift. The "4" indicator in the display will flash, the splitter will be urged to the neutral condition, and fuel will be controlled to dither about zero flywheel torque, allowing an easy lever shift to neutral and, after neutral is sensed, to cause substantially synchronous conditions for smooth engagement of the 3/4 main section ratio gear. For a 4-6 shift, no splitter shift is required and the splitter will be returned to its original position upon sensing main section neutral. Upon confirmation that fourth is engaged, the "4" indicator will be lit and fuel control returned to the operator. Similarly, two "down" pulses followed rapidly by retaining the selector in the "down" displaced position will be taken as a request for an assisted 6-3 skip downshift and, if allowable under current vehicle operating conditions, the ECU 146 will automatically command the fuel controller 112 and splitter actuator 116 to assist same.

When in or after shifted to the "A" position 136 (i.e., 9/10), the ECU 146 will command the fuel controller 112 and splitter operator 116 to automatically select and implement appropriate 9-10 and 10-9 shifts. Automatic operation within an upper group of ratios is disclosed in aforementioned U.S. Pat. Nos. 4,722,248; 4,850,236 and 5,498,195. Systems incorporating this feature are sold by Eaton Corporation under the "Super 10 Top-2" trademark and by Dana Corporation under the "Automate-2" trademark.

To shift out of the "A" position, the operator may simply use the clutch pedal 115, throttle pedal 113 and shift lever 57 to perform a fully manual shift to another ratio. If an assisted lever shift from "A" to eighth (or a lower ratio) is required, the selector rocker 120B may be retained in the "down" position, which will cause the ECU 146 to command the fuel controller 112 and/or splitter actuator 116 to assist the lever or combined lever-and-splitter shift from the engaged "A" ratio (ninth or tenth) to a selected target ratio. Pulses of the selector (and "up" continuing displacements), when in the "A" position, are ignored by the ECU.

Although the preferred embodiment does not have an operator on/off switch for disabling the system, it is contemplated that a fault-tolerant mode will be provided whereby the driver may use the selector 120 to select splitter shifts or, if that is not possible, the transmission 10 will be operated as a wide-step, fully manual, 5-speed, or at least 3-speed (½, 3/4 and 5/8) transmission for limp-home and/or pull-off-the-road purposes.

According to the control of the present invention, fueling to break torque will involve causing the engine to develop a gross torque ($T_{EG}$), which will result in a dither about zero flywheel torque ($T_{FW}$=0). As described in aforementioned U.S. Pat. No. 5,508,916, a similar dither technique may be utilized to assure full engagement of the jaw clutch members associated with a target gear ratio.

Upon completion of a shift and confirmation thereof, control of fueling is returned to the operator. The clutch pedal 115 is not intended to be used, except for stopping or for start-from-stop operations. If the clutch is manually disengaged during a shifting operation, throttle control is immediately returned to the operator.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling a vehicular transmission system comprising a fuel-controlled engine, a fuel controller for controlling fueling of the engine, a compound transmission having an input shaft driven by the engine and an output shaft, said transmission including a main transmission section connected in series with a splitter-type auxiliary section, said splitter-type auxiliary section interposed between said main sectioin and said output shaft, a three-position splitter actuator for shifting said splitter-type auxiliary section to a selected one of a first splitter ratio, a second splitter ratio and a splitter neutral position, a device for sensing a driver's intent to shift from a currently engaged ratio and for providing a signal indicative thereof, a control unit for receiving input signals, including at least said intent-to-shift signal, and for processing same according to logic rules to issue command output signals to system actuators including at least said fuel controller and said splitter actuator, said method comprising the step of:
   (a) upon sensing a driver intent to shift said main transmission section while the transmission is engaged in a transmission ratio, causing the splitter actuator to urge a shift to the splitter-neutral position while causing the engine to be fueled to minimize torque transfer from said input shaft to said output shaft.

2. The method of claim 1 including the step, after step (a), of:
   (b) upon sensing disengagement of either one of said main transmission section and said auxiliary transmission section, ceasing to cause said engine to be fueled to minimize torque transfer between said input shaft and said output shaft.

3. The method of claim 2 wherein said logic includes rules for determining a target gear ratio and including the further step, after step (a) of:
   (c) if disengagement of said main transmission section is sensed, causing said splitter-type auxiliary section to shift to the appropriate splitter ratio for the target gear ratio.

4. The method of claim 1 wherein said main section is manually shifted by a shift lever.

5. A system for controlling a vehicular transmission system comprising a fuel-controlled engine, a fuel controller for controlling fueling of the engine, a compound transmission having an input shaft driven by the engine and an output shaft, said transmission including a main transmission section connected in series with a splitter section, said splitter section interposed between said main transmission section and said output shaft, a three-position splitter actuator for shifting said splitter section to a selected one of a first splitter ratio, a second splitter ratio and a splitter neutral position, a device for sensing a driver's intent to shift from a currently engaged ratio and for providing a signal indicative thereof, a control unit for receiving input signals, including at least said intent-to-shift signal, and for processing same according to logic rules to issue command output signals to system actuators including at least s aid fuel con troller and said splitter actuator, said system characterized by said logic rules including rules for:
   (a) upon sensing a driver intent to shift said main transmission section while the transmission is engaged in a transmission ratio, causing the splitter actuator to urge a shift to the splitter-neutral position while causing the engine to be fueled to minimize torque transfer from said input shaft to said output shaft.

6. The system of claim 5 further including logic rules for:
   (b) upon sensing disengagement of either one of said main transmission section and said splitter section, ceasing to cause said engine to be fueled to minimize torque transfer between said input shaft and said output shaft.

7. The system of claim 6 wherein said logic includes rules for determining a target gear ratio and for:
   (c) if disengagement of said main transmission section is sensed, causing said splitter section to shift to the appropriate splitter ratio for the target gear ratio.

8. The system of claim 5 wherein said main section is manually shifted by a shift lever.

9. A method for controlling a vehicular transmission system comprising a fuel-controlled engine, a fuel controller for controlling fueling of the engine, a compound transmission having an input shaft driven by the engine and an output shaft, said transmission including a manually shifted main transmission section connected in series with a splitter-type auxiliary section interposed between the main transmission section and the output shaft, a three-position splitter actuator for shifting said splitter-type auxiliary section to a selected one of a first splitter ratio, a second splitter ratio and a splitter neutral position, a device for sensing a driver's intent to shift said main transmission section from a currently engaged ratio and for providing a signal indicative thereof, a control unit for receiving input signals, including at least said intent-to-shift signal, and for processing same according to logic rules to issue command output signals to system actuators including at least said splitter actuator, said method comprising the step of:

(a) upon sensing a driver intent to shift said main transmission section while the transmission is engaged in a transmission ratio, causing the splitter actuator to urge a shift to the splitter-neutral position.

10. The method of claim 9 wherein said main section is manually shifted by a shift lever.

11. A system for controlling a vehicular transmission system comprising a fuel-controlled engine, a fuel controller for controlling fueling of the engine, a compound transmission having an input shaft driven by the engine and an output shaft, said transmission including a manually shifted main transmission section connected in series with a splitter section interposed between the main transmission section and the output shaft, a three-position splitter actuator for shifting said splitter section to a selected one of a first splitter ratio, a second splitter ratio and a splitter neutral position, a device for sensing a driver's intent to shift said main transmission section from a currently engaged ratio and for providing a signal indicative thereof, a control unit for receiving input signals, including at least said intent-to-shift signal, and for processing same according to logic rules to issue command output signals to system actuators including at least said splitter actuator, said system characterized by said logic rules including rules for:

(a) upon sensing a driver intent to shift said main transmission section while the transmission is engaged in a transmission ratio, causing the splitter actuator to urge a shift to the splitter-neutral position.

12. A method for controlling a vehicular transmission system comprising a fuel-controlled engine, a fuel controller for controlling fueling of the engine, a compound transmission having an input shaft driven by the engine and an output shaft, said transmission including a main transmission section connected in series with an auxiliary section interposed between the main transmission section and the output shaft, a three-position actuator for shifting said auxiliary section to a selected one of a first auxiliary ratio, a second auxiliary ratio and an auxiliary neutral position, a device for sensing a driver's intent to shift said main transmission section from a currently engaged ratio and for providing a signal indicative thereof, a control unit for receiving input signals, including at least said intent-to-shift signal, and for processing same according to logic rules to issue command output signals to system actuators including at least said fuel controller and said auxiliary actuator, said method comprising the step of:

(a) upon sensing a driver intent to shift said main transmission section while the transmission is engaged in a transmission ratio, causing the auxiliary actuator to urge a shift to the auxiliary-neutral position while causing the engine to be fueled to minimize torque transfer from said input shaft to said output shaft.

13. The method of claim 12 including the step, after step (a), of:

(b) upon sensing disengagement of either one of said main transmission section and said auxiliary transmission section, ceasing to cause said engine to be fueled to minimize torque transfer between said input shaft and said output shaft.

14. The method of claim 12 wherein said main section is manually shifted by a shift lever.

* * * * *